(12) United States Patent
Kim

(10) Patent No.: US 12,373,938 B2
(45) Date of Patent: Jul. 29, 2025

(54) METHOD AND DEVICE FOR DETERMINING WRINKLE AREA FOR SEAT

(71) Applicant: HANUL SYSTEM CO., LTD., Daegu (KR)

(72) Inventor: Ho Young Kim, Daegu (KR)

(73) Assignee: HANUL SYSTEM CO., LTD., Daegu (KR)

( * ) Notice: Subject to any disclaimer, the term of this patent is extended or adjusted under 35 U.S.C. 154(b) by 91 days.

(21) Appl. No.: 17/922,175

(22) PCT Filed: Jun. 8, 2022

(86) PCT No.: PCT/KR2022/008086
§ 371 (c)(1),
(2) Date: Oct. 28, 2022

(87) PCT Pub. No.: WO2022/260431
PCT Pub. Date: Dec. 15, 2022

(65) Prior Publication Data
US 2024/0221148 A1    Jul. 4, 2024

(30) Foreign Application Priority Data

Jun. 9, 2021 (KR) .................. 10-2021-0075047
Jun. 9, 2021 (KR) .................. 10-2021-0075048

(51) Int. Cl.
*G06K 9/00* (2022.01)
*A61K 35/12* (2015.01)
(Continued)

(52) U.S. Cl.
CPC ............ *G06T 7/001* (2013.01); *B60N 2/7017* (2013.01); *G06T 7/11* (2017.01); *G06T 7/20* (2013.01); *G06V 10/764* (2022.01); *G06V 10/776* (2022.01); *G06V 20/50* (2022.01); *G06T 2207/20021* (2013.01);
(Continued)

(58) Field of Classification Search
CPC ............ G06K 9/00; G06T 7/00; A61K 35/12
USPC ....... 382/100, 103, 106, 108, 123, 143, 144, 382/155, 162, 168, 173, 181, 199, 224,
(Continued)

(56) References Cited

U.S. PATENT DOCUMENTS

2006/0209072 A1* 9/2006 Jairam ................ G06F 18/24
345/440
2019/0102601 A1* 4/2019 Karpas ................ G06V 20/64
(Continued)

OTHER PUBLICATIONS

The effects of selected improving methods on wrinkle resistance of warrp knitted and laminated car inkle resistance (Year: 2014).*
(Continued)

*Primary Examiner* — Seyed H Azarian
(74) *Attorney, Agent, or Firm* — Sughrue Mion, PLLC

(57) ABSTRACT

Disclosed is a method, according to a first embodiment of the present disclosure, comprising obtaining a first image of the whole of a back seat; obtaining a second image of the whole of a cushion seat; obtaining deep learning information used for analyzing the images of the back seat and cushion seat; determining a problem area from the first image and second image using the deep learning information; obtaining a detailed image of the problem area; and determining a wrinkle area using the detailed image.

10 Claims, 11 Drawing Sheets

(51) Int. Cl.
  *B60N 2/70* (2006.01)
  *G06T 7/00* (2017.01)
  *G06T 7/11* (2017.01)
  *G06T 7/20* (2017.01)
  *G06V 10/764* (2022.01)
  *G06V 10/776* (2022.01)
  *G06V 20/50* (2022.01)

(52) U.S. Cl.
  CPC ............... *G06T 2207/20081* (2013.01); *G06T 2207/30124* (2013.01); *G06T 2207/30204* (2013.01)

(58) Field of Classification Search
  USPC ....... 382/209, 220, 254, 274, 276, 286–291, 382/305, 312; 345/170, 440
  See application file for complete search history.

(56) References Cited

U.S. PATENT DOCUMENTS

2019/0108396 A1* 4/2019 Dal Mutto ............. G06V 20/52
2019/0120774 A1* 4/2019 Whitens ........... G01N 21/95607
2021/0133426 A1* 5/2021 Karpas ................... G06V 10/82

OTHER PUBLICATIONS

Wrinkle (Year: 2014).*

* cited by examiner

METHOD AND DEVICE FOR DETERMINING WRINKLE AREA FOR SEAT

This application is a National Stage of International Application No. PCT/KR2022/008086 filed Jun. 8, 2022, claiming priority based on Korean Patent Application No. 10-2021-0075047 filed Jun. 9, 2021 and Korean Patent Application No. 10-2021-0075048 filed Jun. 9, 2021, the entire disclosures of which are incorporated herein by reference.

TECHNICAL FIELD

A first embodiment of the present disclosure relates to a method and device for determining a wrinkle area for a seat. More specifically, a first embodiment of the present disclosure relates to a method and device for determining a wrinkle area for a seat by obtaining an image of a back seat and an image of a cushion seat, obtaining deep learning information used for analyzing the images of the back seat and cushion seat and thereby obtaining a detailed image including a problem area from the images of the back seat and cushion seat, and determining the wrinkle area using the detailed image.

Also, a second embodiment of the present disclosure relates to a method and device for determining a wrinkle area for a seat. More specifically, a second embodiment of the present disclosure relates to a method and device for determining a wrinkle area for a seat by obtaining an image of a seat, determining whether wrinkle evaluation values derived for a plurality of unit areas of the obtained image are more than a threshold value, and determining a wrinkle area of one or more unit areas corresponding to the wrinkle evaluation values that are more than the threshold value.

BACKGROUND ART

Automated processes have been increasingly introduced in various industrial environments due to production efficiency and quality, reduction of labor costs, convenience in process control and growth of untact industries. Such automated processes have been applied to vehicle manufacturing processes to manufacture many products for vehicles such as interior materials and exterior materials.

The conventional automated processes employ pre-set operation control algorithms instead of manual operations, which apply the same processes to most products.

Even for fabric or leather seat products that are sensitive to deformation and thus are necessarily subjected to separate additional processes for removing wrinkles, such automated processes employ standardized processes. Thus, consistent quality is not ensured and products with poor quality may be mass produced in some cases.

Particularly, consumer interests on convenience and quality of vehicle interior products such as seats are growing significantly. Consumers are highly sensitive to seat quality because seats taking up the largest part of the interior of a vehicle are one of the products that a driver contacts most largely and frequently. However, a technique of recognizing wrinkle areas selectively from the entire seat, determining wrinkles for the recognized areas and removing the wrinkles has not been applied to common automated processes, which causes continuous damages in time and costs.

DETAILED DESCRIPTION OF INVENTION

Technical Task

It is a technical task, which is to be achieved according to a first embodiment of the present disclosure, to provide a method and device for determining a wrinkle area by determining a problem area regarding wrinkles from a first image of a back seat and a second image of a cushion seat using deep learning information used for analyzing the first image and second image, and obtaining a detail image of the determined problem area.

Also, it is a technical task, which is to be achieved according to a second embodiment of the present disclosure, to provide a method and device for determining a wrinkle area by obtaining wrinkle evaluation values from a plurality of unit areas for an image, determining whether the derived wrinkle evaluation values are more than a threshold value, and determining a wrinkle area for the image based on the continuity of one or more unit areas corresponding to the wrinkle evaluation values that are more than the threshold value.

The tasks of the present disclosure are not limited to the aforementioned tasks, and other tasks that are not mentioned can be clearly understood from the following description.

Means for Solving Technical Task

As a technical means for achieving the technical tasks above, a method for determining a wrinkle area for a seat by a device according to a first aspect of the present disclosure may comprise obtaining a first image of the whole of a back seat; obtaining a second image of the whole of a cushion seat; obtaining deep learning information used for analyzing the images of the back seat and cushion seat; determining a problem area from the first image and second image using the deep learning information; obtaining a detailed image of the problem area; and determining a wrinkle area using the detailed image.

Also, the determining a problem area may comprise determining a plurality of areas by dividing each of the first image and second image according to a predetermined way; and determining one or more areas among the plurality of areas as the problem area using the deep learning information, wherein the detailed image may be obtained while a camera oriented toward the back seat or cushion seat moves along a path of traveling the plurality of areas.

Also, the obtaining a detailed image may comprise determining a moving speed of a camera according to the location of the camera based on pre-analysis results on the problem area; and obtaining the detailed image from the camera moving at the moving speed.

Also, the deep learning information may be obtained based on image analysis results on a test back seat and a test cushion seat which form a test seat.

Also, the obtaining deep learning information may comprise obtaining an image of the test back seat from a first test camera oriented toward the test back seat while a second lighting device oriented toward the test cushion seat operates; obtaining an image of the test cushion seat from a second test camera oriented toward the test cushion seat while a first lighting device oriented toward the test back seat operates; and obtaining the deep learning information using the image of the test back seat and the image of the test cushion seat.

Also, the method may further comprise determining a type of wrinkle of the wrinkle area based on wrinkle size and wrinkle depth corresponding to the wrinkle area; determining an ironing way including ironing number and ironing time corresponding to the type of wrinkle; and ironing the wrinkle area according to the ironing way.

A device for determining a wrinkle area for a seat according to a second aspect of the present disclosure may comprise one or more cameras for obtaining a first image of the whole of a back seat and a second image of the whole of a cushion seat; and a processor for obtaining deep learning information used for analyzing the images of the back seat and cushion seat, and determining a problem area from the first image and second image using the deep learning information, wherein the one or more cameras may obtain a detailed image of the problem area, and the processor may determine a wrinkle area using the detailed image.

Also, as a technical means for achieving technical tasks above, a method for determining a wrinkle area for a seat by a device according to a third aspect of the present disclosure may comprise obtaining an image of the seat; determining a plurality of unit areas constituting the image and including one or more pixels; determining whether a wrinkle evaluation value derived for each of the plurality of unit areas is more than a threshold value; and determining a wrinkle area for the image based on the continuity of one or more unit areas corresponding to the wrinkle evaluation values that are more than the threshold value.

Also, each unit area constituting the plurality of unit areas may be a single pixel.

Also, the method may further comprise displaying the wrinkle area on the image; obtaining a marking image corresponding to the wrinkle area; and matching the marking image with the image to obtain a result image.

Also, the method may further comprise obtaining wrinkle evaluation elements including at least one of the lightness and saturation of the plurality of unit areas, brightness of a lighting device, and color of the seat; and determining the wrinkle evaluation value based on the results of combination of the obtained wrinkle evaluation elements.

Also, the threshold value may be determined from deep learning, and the determining the threshold value may comprise performing the deep learning on the wrinkle area using a pre-stored learning model; and determining the threshold value for determining a wrinkle for the plurality of unit areas based on the results of the deep learning, and may further comprise performing re-learning when the accuracy of the results of the deep learning is a predetermined value or less.

Also, the determining a wrinkle evaluation value may comprise, when the seat is made of leather, giving a weighting in order of the color of the seat, the brightness of the lighting device, the lightness and the saturation; when the seat is made of fabric, giving a weighting in order of the brightness of the lighting device, the color of the seat, the lightness and the saturation; and determining the wrinkle evaluation value based on the weighting.

A device for determining a wrinkle area for a seat according to a fourth aspect of the present disclosure may comprise one or more cameras for obtaining an image of the seat; and a processor for determining a plurality of unit areas constituting the image and including one or more pixels, determining whether a wrinkle evaluation value derived for each of the plurality of unit areas is more than a threshold value, and determining a wrinkle area for the image based on the continuity of one or more unit areas corresponding to the wrinkle evaluation values that are more than the threshold value.

Other specific matters of the present invention are included in the detailed description and drawings.

Effect of Invention

According to an embodiment of the present disclosure, efficiency may be significantly increased compared to conventional techniques of detecting wrinkles with the naked eyes, by determining, as a problem area, one or more areas that have wrinkles or damages, among a plurality of areas, using deep learning images.

Also, the present disclosure determines an ironing way to correspond to each type of wrinkle, and provides optimal ironing ways for wrinkles with different depths, sizes, etc., thereby removing wrinkles effectively.

Also, according to an embodiment of the present disclosure, it is possible to detect wrinkles with higher accuracy by performing deep learning on wrinkle areas using a pre-stored learning model and performing re-learning when the accuracy of the results of deep learning is low.

Also, compared to conventional techniques of detecting wrinkles of a seat with the naked eyes, the present disclosure learns wrinkle areas from deep learning, thereby significantly increasing efficiency.

The effects of the present invention are not limited to the above-mentioned effects, and it should be understood that other effects that are not described herein could be clearly understood by those skilled in the art of the present invention from the following description.

BEST MODE FOR CARRYING OUT THE INVENTION

Figure 1:
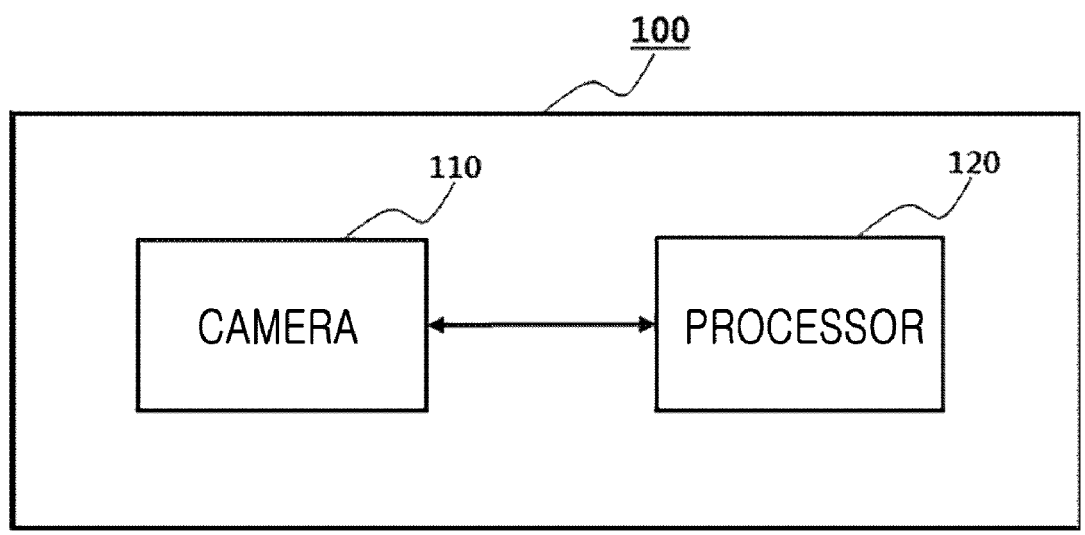
FIG. 1 is a schematic block diagram illustrating the configuration of the device according to an embodiment.

Advantages and features of the present invention and methods for achieving the same will be apparent with reference to the embodiments described below in detail along with the accompanying drawings. However, the present invention is not limited to the embodiments described below, but can be implemented in different forms, and the embodiments are only to make the disclosure of the present invention complete, and to fully inform the scope of the present invention to those having ordinary knowledge in the art to which the present invention pertains. The present invention is defined only by the scope of the claims.

The terminology used herein is for the purpose of describing embodiments only and is not intended to limit the present invention. In the present specification, the singular also includes the plural unless specifically stated otherwise in the phrase. As used herein, "comprises" and/or "comprising" does not exclude the presence or addition of one or more other components in addition to the mentioned components. Like reference numerals refer to like elements throughout the specification, and "and/or" includes each and every combination of one or more of the mentioned items. Although, the "first," "second," etc., are used to describe various components, these components are of course not limited by these terms. These terms are only used to distinguish one component from another component. Therefore, the first component mentioned below may be a second component within the technical idea of the present invention.

Unless otherwise defined, all terms (including technical and scientific terms) used herein may be used in a sense that can be commonly understood by those skilled in the art. In addition, the terms defined in the commonly used dictionaries are not ideally or excessively interpreted unless they are specifically defined clearly.

The spatially relative terms "below," "beneath," "lower," "above," "upper," etc., can be used to easily describe a component's correlation with other components. Spatially relative terms are to be understood as including terms in different directions of components in use or operation in addition to the directions shown in the drawings. For example, when flipping a component shown in the drawings, a component described as "below" or "beneath" of another component may be placed "above" the other component. Thus, the exemplary term "below" can encompass both an orientation of above and below. The components can be oriented in other directions as well, so that spatially relative terms can be interpreted according to the orientation.

Hereinafter, the embodiments of the present invention will be described in detail with reference to the accompanying drawings.

Hereinafter, a first embodiment of the present disclosure will be described with reference to FIG. 1 to FIG. 5.

FIG. 1 is a schematic block diagram illustrating the configuration of the device 100 according to an embodiment.

Referring to the drawing, the device 100 may comprise one or more cameras 110 and a processor 120.

The camera 110 may obtain a first image 510 of the whole of a back seat and a second image 520 of the whole of a cushion seat.

The back seat may refer to a portion of the full seat for supporting the back of the user's body, and the cushion seat may refer to a portion of the full seat for supporting the bottom of the user's body.

The back seat and cushion seat are generally manufactured with the same material in the same color, but may also be manufactured with different materials in different colors. In addition, the seat may further have a headrest for supporting the head of the user's body, and one or more cameras 110 may obtain a third image of the whole of a headrest.

The processor 120 may obtain deep learning information used for analyzing the images of the back seat and cushion seat, and determine a problem area from the first image 510 and second image 520 using the deep learning information.

In addition, the one or more cameras 110 may obtain a detailed image of the problem area, and the processor 120 may determine a wrinkle area using the detailed image.

Various embodiments of the aforementioned configurations are described below with reference to the drawings.

In addition, those skilled in the art can understand that the device 100 may further comprise other general components than those shown in FIG. 1. For example, the device 100 may further comprise a memory (not shown) for storing the first image 510 and second image 520. According to another embodiment, those skilled in the art can understand that some components among those shown in FIG. 1 may be omitted.

The device 100 according to an embodiment may be used by a user or operator, and may include all types of handheld wireless communication devices having a touch screen panel, such as a mobile phone, smart phone, personal digital assistant (PDA), portable multimedia player (PMP), tablet PC, etc., and may include a device that can install and execute an application, such as a desktop PC, tablet PC, laptop PC, IPTV including set-top box in addition to the above.

The device 100 may be implemented as a terminal such as a computer operated through a computer program for performing functions described herein.

The device 100 according to an embodiment may comprise a wrinkle area determination system (not shown) and a server (not shown), but is not limited thereto. The server according to an embodiment may provide an application displaying a determined wrinkle area and provide a service supporting deep learning on the wrinkle area.

Hereinafter, the device 100 according to an embodiment that independently determines a wrinkle area is mainly described, but the wrinkle area may be determined by communicating with a server as described above. That is, the device 100 according to an embodiment and the server may be integrally implemented in terms of function, and the server may be omitted. It can be understood that the present invention is not limited to any one embodiment. Also, the term device 100 is described as a generic concept covering a server, and accordingly, embodiments providing the notice at the device 100 may be performed by a server.

Figure 2:
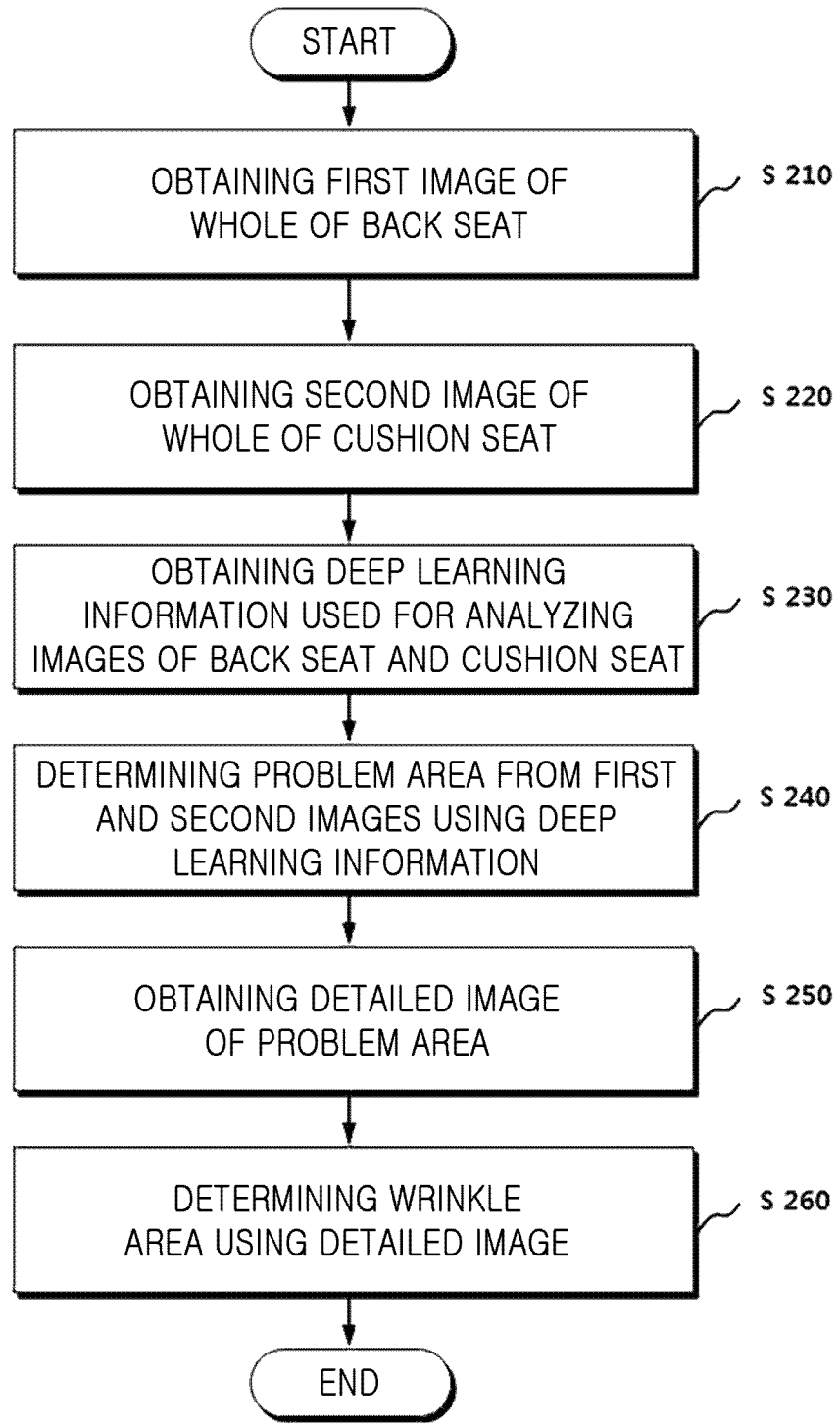
FIG. 2 is a flow chart illustrating each step operated by the device according to an embodiment.

FIG. 2 is a flow chart illustrating each step operated by the device 100 according to an embodiment.

In steps S210 and S220, the device 100 may obtain a first image 510 of the whole of a back seat and a second image 520 of the whole of a cushion seat.

In an embodiment, the device 100 may comprise a structure type 300 and a robot type 400. For example, the structure type 300 may have cameras 110 and lighting devices oriented toward the back seat and cushion seat to obtain the first image 510 and second image 520 by controlling the one or more cameras 110 and lighting devices while the seat is moving via a conveyor belt. The robot type 400 may have one or more cameras 110 and lighting devices and move along a path corresponding to the seat area, to obtain the first image 510 and second image 520 by controlling the cameras 110 and lighting devices.

Generally, the structure type 300 may be used to determine a wrinkle area for the seat, and the robot type 400 may be used to perform deep learning for seat wrinkles, but they are not necessarily limited thereto.

In step S230, the device 100 may obtain deep learning information used for analyzing the images of the back seat and cushion seat.

In an embodiment, deep learning information may be used for determining a problem area including wrinkles for the first image 510 and second image 520 obtained for the seat. The deep learning information may be obtained based on image analysis results on a test back seat 310 and a test cushion seat 320 constituting a test seat for obtaining deep learning information.

For example, in order to obtain deep learning information, the device 100 may obtain an image of the back seat from a first test camera 330 oriented toward the test back seat 310 while a second lighting device 360 oriented toward the test cushion seat 320 operates (S1), obtain an image of the test cushion seat 320 from a second test camera 350 oriented toward the test cushion seat 320 while a first lighting device 340 oriented toward the test back seat 310 operates (S2), and obtain deep learning information using the images of the test back seat 310 and test cushion seat 320 (S3).

Specifically, in the case the second lighting device 360 oriented toward the test cushion seat 320 operates in step S1, when the image of the test cushion seat 320 is obtained using the second test camera 350 oriented toward the test cushion seat 320, the light of the second lighting device 360 is radiated on the cushion seat disposed in front of the second lighting device 360, and thus wrinkles are not clearly shown in the image. On the other hand, in the case the second lighting device 360 operates, when the image of the test back seat 310 is obtained using the first test camera 330, a wrinkle area is shaded by the second lighting device 360, and thus it may be easier to determine wrinkles on the image.

In a similar manner, in the case the first lighting device 340 oriented toward the test back seat 310 operates in step S2, when the image of the test cushion seat 320 is obtained using the second test camera 350 oriented toward the test cushion seat 320, it may be easier to determine wrinkles in the wrinkle area on the image.

Accordingly, in step S3, the device 100 may obtain deep learning information by performing deep learning on the problem area including the wrinkle area present in the images using the images of the test back seat 310 and test cushion seat 320 obtained in steps S1 and S2.

In an embodiment, the device 100 may classify deep learning information into different categories depending on the conditions of the type of vehicle, type of seat, color of seat, etc., and store and manage the information. Accordingly, the device 100 may obtain deep learning information corresponding to the type and color of the test seat and the type of the vehicle to be applied, separately. Then, in the step of determining a problem area, deep learning information corresponding to the type and color of the seat that is subject to determination of a wrinkle area and the type of the vehicle to be applied may be used from the obtained deep learning information.

In step S240, the device 100 may determine a problem area from the first image 510 and second image 520 using the deep learning information.

Figure 5:
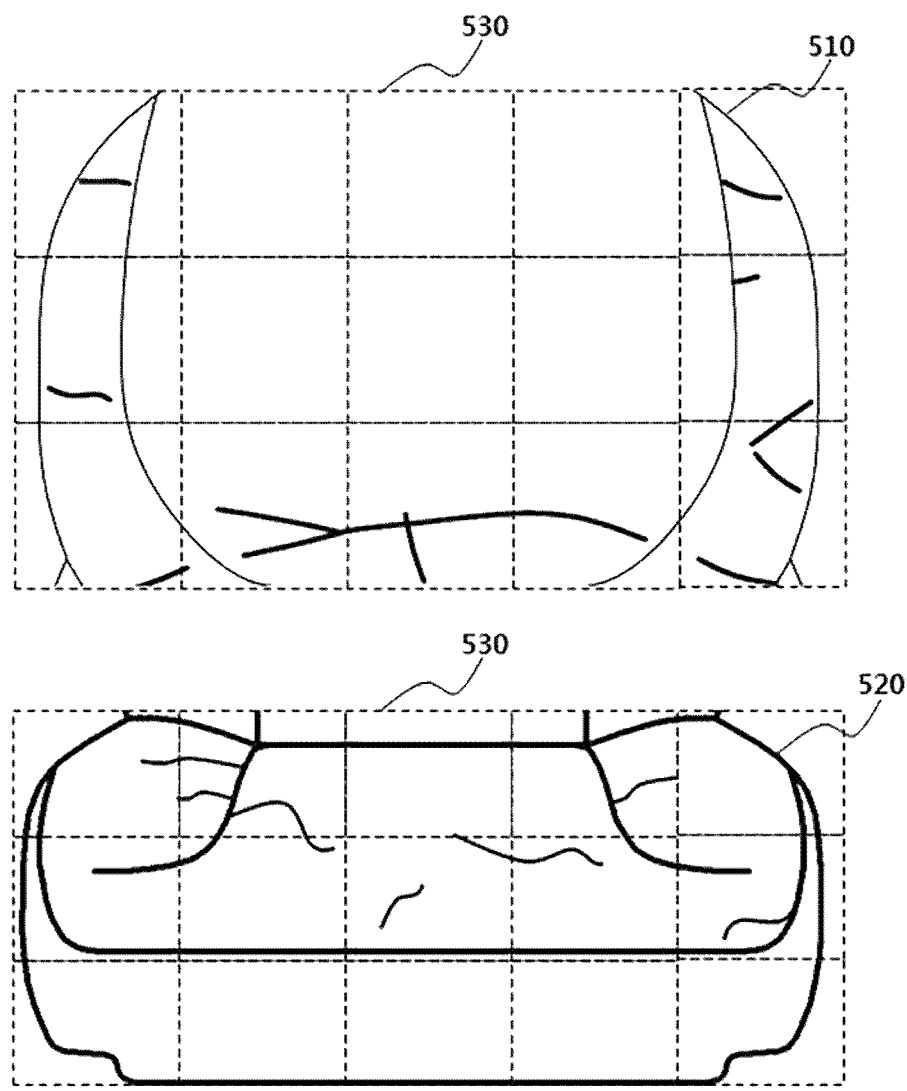
FIG. 5 is a schematic view illustrating an example of determining the problem area according to an embodiment.

For example, referring to FIG. 5, the device 100 may determine a plurality of areas 530 by dividing each of the first image 510 and second image 520 according to a predetermined way (e.g., dividing into predetermined unit areas). In step S230, the device 100 may determine one or more areas among the plurality of areas 530 as a problem area using the deep learning information obtained in step S230.

Specifically, a problem area may include a portion having seat wrinkles and contamination, which leads to a decline in quality. For example, the device 100 may more precisely detect a problem area having fine wrinkles by dividing into a plurality of areas 530 so that each image is segmented.

For example, the device 100 may divide the first image 510 and second image 520 into the plurality of areas 530 so as to have pixels, minimum unit area of each image, corresponding to a predetermined number range, and detect wrinkles for each of the plurality of areas 530 divided using deep learning information. The device 100 may determine as a problem area at least one area including wrinkles among the plurality of areas 530 according to the detection results.

As such, a wrinkle area may be more precisely determined by determining the problem area for the segmented areas.

In step S250, the device 100 may obtain a detailed image for the problem area obtained in step S240, and in step S260, the device may determine a wrinkle area using the detailed image.

The detailed image may be obtained while the camera 110 oriented toward the back seat or cushion seat moves along a path of traveling the plurality of areas 530.

Specifically, the device 100 may be implemented as a robot type 400 to determine a wrinkle area for the seat, determine a moving speed according to the location of the camera 110 oriented toward the back seat or cushion seat based on the pre-analysis results on the problem area, and obtain a detailed image from the camera 110 moving at the determined moving speed.

For example, the device 100 may primarily preform pre-analysis of detecting areas requiring a certain amount of time or more for wrinkle recognition, areas requiring a certain amount of time or less for the same, the number and depth of wrinkles, and the size of wrinkle area, etc., for all the problem areas, and perform pre-analysis on locations of the areas for which wrinkles are detected relatively easily or relatively difficultly, based on the pre-analysis results.

The device 100 may determine a moving speed at a predetermined speed or faster or at a predetermined speed or slower for the areas for which wrinkles are detected relatively easily or relatively difficultly, based on the pre-analysis results.

For example, when the camera 110 moving along a path of traveling problem areas according to the pre-analysis results is located in an area for which wrinkles are detected relatively easily, the device 100 determines the moving speed of the camera 110 at a predetermined speed or faster to travel the corresponding area fast. When the camera 110 is located in an area for which wrinkles are detected relatively difficultly, the device 100 may determine the moving speed of the camera 110 at a predetermined speed or slower to travel the corresponding area slow.

For the area for which wrinkles are determined to be detected difficultly, the device 100 determines the moving speed of the camera 110 at a predetermined speed or slower, to detect wrinkles more precisely, thereby obtaining the predetermined number or more of detailed images or the predetermined image length or longer of detailed images. For the area for which wrinkles are determined to be detected easily, the device 100 determines the moving speed of the camera 110 at a predetermined speed or slower, thereby obtaining the predetermined number or less or the predetermined image length or shorter of detailed images. As such, the device 100 determines a moving speed of the camera 110 differently based on the pre-analysis results even for the same problem area, thereby obtaining a detailed image for more efficient wrinkle detection. Then, the device 100 may determine a wrinkle area based on the obtained detailed image. Accordingly, unlike conventional technology which simply employs a deep learning model to detect characteristic points of the images or is based on algorithm, the device 100 allows very precise wrinkle detection because it detects wrinkles using detailed images obtained in different ways depending on the wrinkle degree of the problem area divided into the plurality of areas 530.

Figure 3:
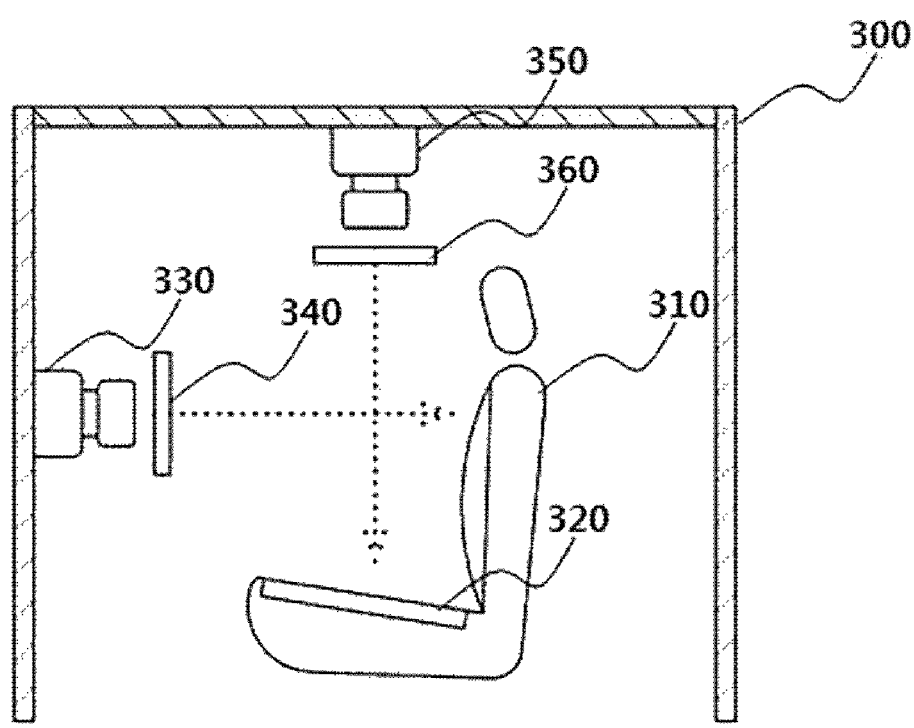
FIG. 3 is a schematic view illustrating an example of the structure type according to an embodiment.

FIG. 3 is a schematic view illustrating an example of the structure type 300 according to an embodiment.

Referring to the drawing, the device 100 may comprise a first test camera 330 and a first lighting device 340 oriented toward a test back seat 310, and a second test camera 350 and a second lighting device 360 oriented toward a test cushion seat 320, and may be provided as the structure type 300.

For example, in order to obtain deep learning information, when operating the second lighting device 360, the device 100 may turn off the first lighting device 340 so that the first lighting device 340 does not operate, and obtain the image of the test back seat 310 from the first test camera 330. Also, when operating the first lighting device 340, the device 100 may turn off the second lighting device 360 so that the second lighting device 360 does not operate, and obtain the image of the test cushion seat 320 from the second test camera 350.

In another embodiment, when operating the first lighting device 340 or second lighting device 360, the other lighting device may not be turned off. However, in order to obtain more accurate deep learning information, it may be preferable to turn off the other lighting device. Further, while the first test camera 330 obtains the image of the test back seat 310, the second test camera 350 may be turned off so as not to operate, and while the second test camera 350 obtains the image of the test cushion seat 320, the first test camera 330 may be turned off so as not to operate. However, the other camera 110 may not be turned off considering the accuracy of deep learning information may be increased as various images for each seat are obtained.

In an embodiment, the structure type 300 may be configured to move seats (or test seats) via a conveyor belt, and obtain the image of each test seat while the seats move.

Effective deep learning information may be obtained by controlling the operation of each camera 110 and lighting device.

Figure 4:
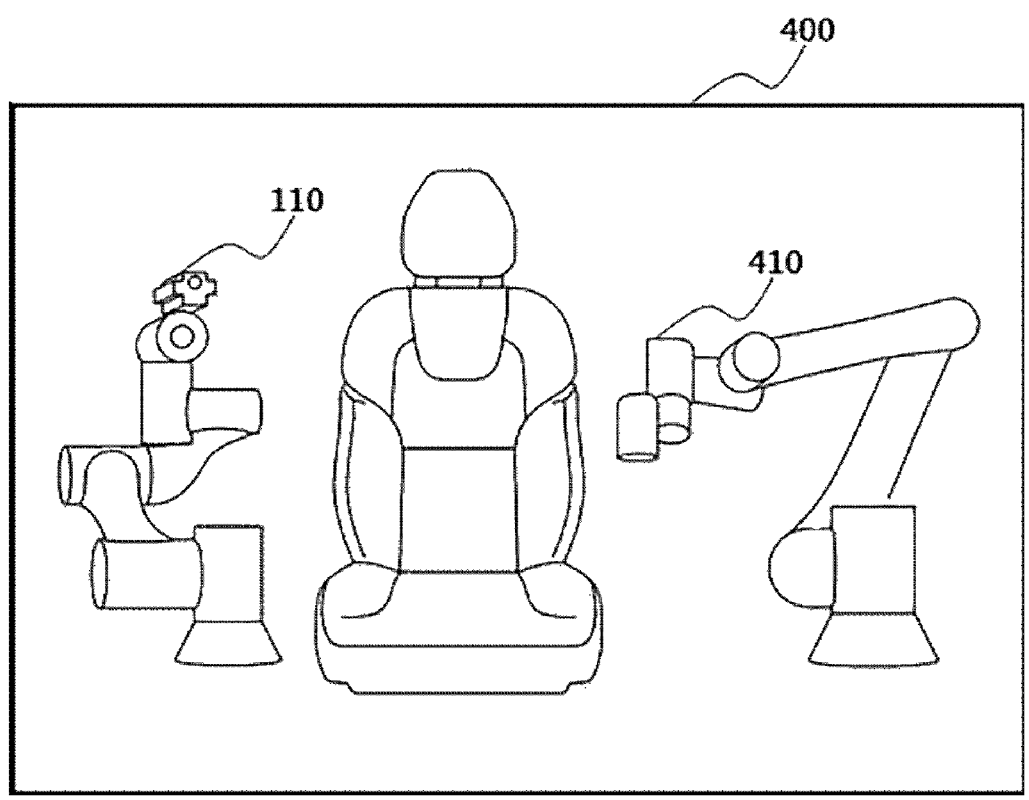
FIG. 4 is a schematic view illustrating an example of the robot type according to an embodiment.

FIG. 4 is a schematic view illustrating an example of the robot type 400 according to an embodiment.

Referring to the drawing, the device 100 may be provided as the robot type 400 having one or more movable cameras 110 and irons 410. Accordingly, the device 100 may use the iron 410 moving along an area corresponding to the determined wrinkle area to iron the area.

In an embodiment, the device 100 may determine a moving speed of the camera 110 according to the location of the camera 110 based on the pre-analysis results on the problem area. The device 100 may obtain a detailed image from the camera 110 moving along the problem area at the moving speed, and determine a wrinkle area using the detailed image.

In an embodiment, the device 100 may determine the type of wrinkle for the wrinkle area based on wrinkle size and wrinkle depth corresponding to the determined wrinkle area.

For example, the type of wrinkle may include a first type of wrinkle which is severe with the wrinkle size and depth of more than predetermined values, a second type of wrinkle which is moderate with the wrinkle size and depth within the predetermined values, and a third type of wrinkle which is mild with the wrinkle size and depth of the predetermined values or less.

Also, the device 100 may determine an ironing way including the number and time of ironing corresponding to the type of wrinkle determined as at least one of the first type, second type and third type of wrinkle, and iron the wrinkle area based on the determined ironing way.

For example, when the type of wrinkle corresponding to one or more wrinkle areas is determined as the first type of wrinkle, the device 100 may iron the wrinkle areas based on the ironing way including the predetermined number and time of ironing.

As such, wrinkles may be removed in the most effective way for each wrinkle area by determining the type of wrinkle depending on different sizes and depths for each wrinkle area, and employing an ironing way corresponding to the type of wrinkle for ironing.

FIG. 5 is a schematic view illustrating an example of determining the problem area according to an embodiment.

Referring to the drawing, for example, the device 100 may determine a plurality of areas 530 by dividing a first image 510 and a second image 520 obtained from the back seat and cushion seat, respectively, according to a predetermined method. The predetermined method may divide into areas to include the predetermined number of pixels. Also, the device 100 may determine one or more areas among the plurality of areas 530 as a problem area, based on the deep learning information obtained from the images of the test seat.

The device 100 may more precisely determine a wrinkle area by determining the problem area for the segmented areas.

In an embodiment, the device 100 may determine leather or fabric for the seat material, based on the images, and determine the priority for determining as a wrinkle area the wrinkle determined based on the continuity of pixels in the detailed image using the detailed image according to the seat material. The detailed image, which is an image obtained according to the pre-analysis results and used for determining a wrinkle area before the wrinkle area is determined, may include information on the depth of wrinkle, length of wrinkle, region of wrinkle and number of wrinkle.

For example, when the determined seat material is leather, wrinkles formed on the surface of leather are relatively deeper than those formed on other materials, and thus the wrinkles should be removed quickly to minimize the damage caused by the wrinkles. In this regard, the device 100 may give the highest weighting on a portion where the depth of wrinkle from the detailed image is a predetermined value or more, and determine a wrinkle area based on the given weighting.

Also, as wrinkles formed on the seat made of leather are longer, it may be considered as somewhat severe wrinkles. However, considering the shape of seat is manufactured according to human body's structural characteristics, and wrinkles having a length of a predetermined value or more may be structural characteristic points generated while manufacturing the seat, a portion where wrinkles have a length of a predetermined value or more from the detailed images may be given the second highest weighting.

Also, when the region of wrinkles from the detailed images is broad over a predetermined value or more, it would be preferable to determine the wrinkles as a wrinkle area and remove the wrinkles. However, there may be a case where a pattern may be formed on the seat using leather, and thus a portion where the region of wrinkles from the detailed image is a predetermined value or more may be given the third highest weighting.

In another embodiment, when the determined seat material is fabric, a relatively high number of wrinkles is formed with shallow depths, compared to the seat made of leather which has a relatively low number of wrinkles with deep depths. Accordingly, it may be preferentially determined whether the wrinkles correspond to a wrinkle area, and thus the device 100 may give the highest weighting on a portion where the region of wrinkles from the detailed image is a predetermined value or more.

Also, when wrinkles from the detailed image are long, it may be preferable to determine the wrinkles as a wrinkle area. However, considering a seat made of fabric has many structural characteristic points such as seams, a wrinkle area should be determined with more focus than the region of wrinkles. Thus, a portion where wrinkles have a length of a predetermined value or more may be given the second highest weighting.

Also, when wrinkles from the detailed images have a depth of a predetermined value or more, it may be preferable to determine the wrinkles as a wrinkle area. However, a seat made of fabric has relatively shallow wrinkles compared to a seat made of other materials such as leather, and thus, the importance is somewhat low. Thus, a portion where wrinkles have a depth of the predetermined value or more may be given the third highest weighting.

The device 100 may decide a material of the seat based on the first image 510 and second image 520, and determine the priority for determining a wrinkle area based on weightings given differently for wrinkles shown in the detailed image for the seat manufactured with the decided material, thereby more accurately determining wrinkles and at the same time minimizing the damage of the seat.

Hereinafter, a second embodiment of the present disclosure is described with reference to FIG. 6 to FIG. 11.

Figure 6:
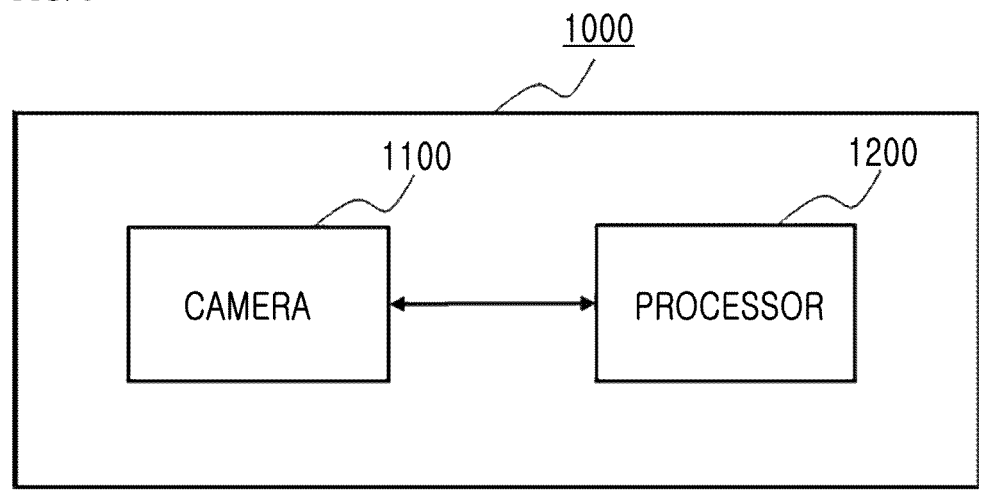
FIG. 6 is a schematic block diagram illustrating the configuration of the device according to an embodiment.

FIG. 6 is a schematic block diagram illustrating the configuration of the device 1000 according to an embodiment.

Referring to the drawings, the device 1000 may comprise one or more cameras 1100 and a processor 1200.

One or more cameras 1100 may obtain an image 3000 for the seat. The image 3000 for the seat obtained from the camera 1100 may include an image of the whole of a back seat 6100 and an image of the whole of a cushion seat 6200.

For example, the device 1000 may be provided as a structure type 6000. In this case, the camera 1100 may include a first test camera 6300 oriented toward the back seat 6100 and a second test camera 6500 oriented toward the cushion seat 6200. Also, the device 1000 of the structure type 6000 may further comprise a first lighting device 6400 oriented toward the back seat 6100 and a second lighting device 6600 oriented toward the cushion seat 6200, which operate along with the camera 1100 to obtain the image 3000 from the camera 1100. The device 1000 may obtain the overall and detailed images of the back seat 6100 and the overall and detailed images of the cushion seat 6200 by operation of each camera 1100 and lighting device.

A detailed image according to an embodiment may be obtained according to the pre-analysis results that determine an area expected to correspond to wrinkles for each seat in advance, and the detailed image may include the area expected to correspond to wrinkles determined according to the pre-analysis results.

The processor 1200 according to an embodiment may determine a plurality of unit areas constituting the image 3000 and including one or more pixels, determine whether a wrinkle evaluation value derived for each of the plurality of unit areas is more than a threshold value, and determine a wrinkle area for the image 3000 based on the continuity of one or more unit areas 3100 corresponding to the wrinkle evaluation values that are more than the threshold value.

Various embodiments of the aforementioned configurations are described below in detail with reference to the drawings.

In addition, those skilled in the art can understand that the device 1000 may further comprise other general components than the components shown in FIG. 6. For example, the device 1000 may further comprise a memory (not shown) for storing an image 3000 and pre-stored learning model.

According to another embodiment, those skilled in the art can understand that some components among the components shown in FIG. 6 may be omitted.

The device 1000 according to an embodiment may be used by a user or operator, and may include all types of handheld wireless communication devices having a touch screen panel such as a mobile phone, smart phone, personal digital assistant (PDA), portable multimedia player (PMP), tablet PC, etc., and may include a device that can install and execute an application, such as a desktop PC, tablet PC, laptop PC, IPTV including set-top box in addition to the above.

The device 1000 may be implemented as a terminal such as a computer operated through a computer program for performing functions described herein.

The device 1000 according to an embodiment may comprise a wrinkle area determination system (not shown) and a server (not shown), but is not limited thereto. The server according to an embodiment may provide an application displaying a determined wrinkle area and provide a service supporting deep learning performance for the wrinkle area.

Hereinafter, the device 1000 according to an embodiment that independently determines a wrinkle area is mainly described, but the wrinkle area may be determined by communicating with a server as described above. That is, the device 1000 according to an embodiment and the server may be integrally implemented in terms of function, and the server may be omitted. It can be understood that the present invention is not limited to any one embodiment. Also, the term device 1000 is described as a generic concept covering a server, and accordingly, embodiments providing the notice at the device 1000 may be performed by a server.

Figure 7:
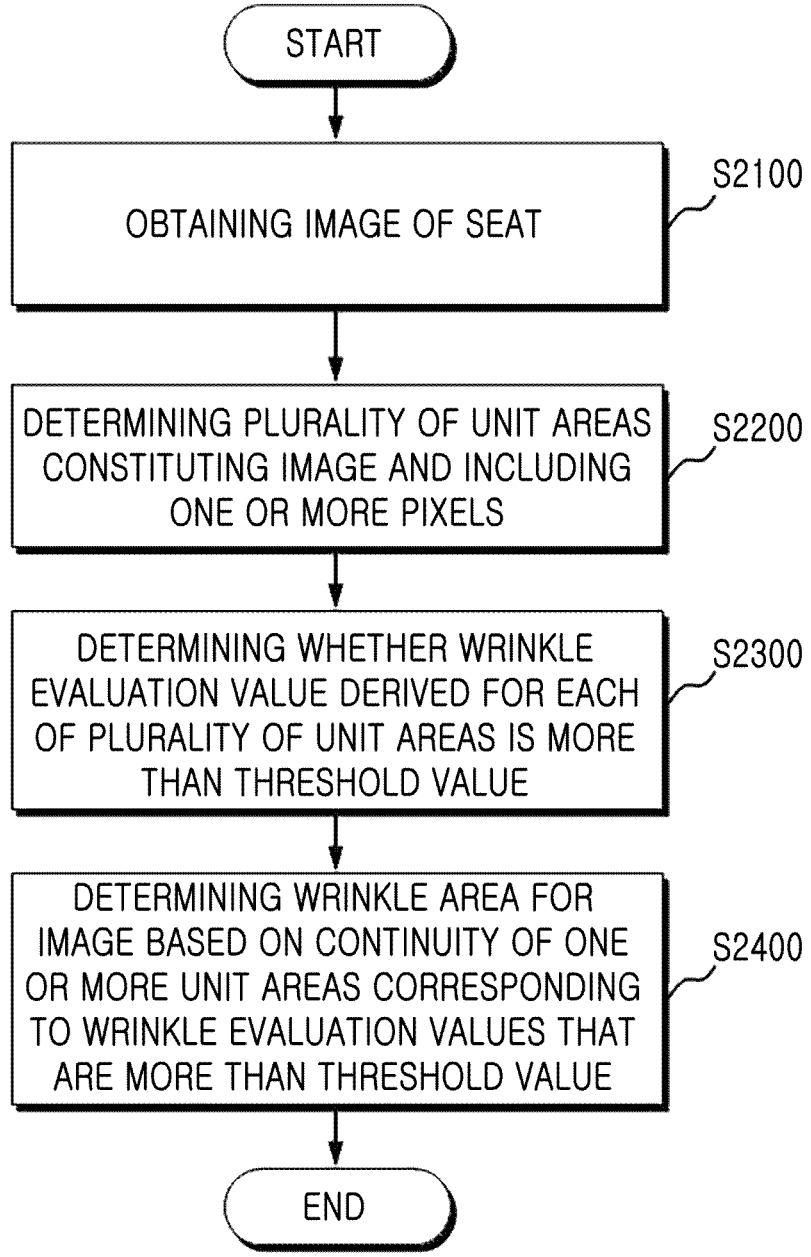
FIG. 7 is a flow chart illustrating each step operated by the device according to an embodiment.

FIG. 7 is a flow chart illustrating each step operated by the device 1000 according to an embodiment.

In step S210, the device 1000 may obtain an image 3000 for the seat.

In an embodiment, the device 1000 may be provided as a structure type 6000 to obtain an image 3000 for the seat. In this case, the device 1000 may obtain a first image of a back seat 6100 and a second image of a cushion seat 6200 by controlling the operation of a first test camera 6300, a second test camera 6500, a first lighting device 6400 and a second lighting device 6600.

A method of obtaining an image of each seat may be implemented and performed in various ways, but a preferred method according to the present disclosure may be a method of obtaining a first image of the back seat 6100 from the first test camera 6300 when the second lighting device 6600 oriented toward the cushion seat 6200 is in the ON state, and obtaining a second image of the cushion seat 6200 from the second test camera 6500 when the first lighting device 6400 is in the ON state.

This method may solve the problem that when the camera 1100 and lighting device are oriented in the same direction, a wrinkle area is not clearly identified due to light radiated directly on the seat. Further, when the camera 1100 and lighting device are configured to be oriented in different directions as above, light is radiated in parallel with the subject seat for image taking, and thus a wrinkle area with curves is shaded by the radiated light, which makes the wrinkle area clearer.

In step S220, the device 1000 may determine a plurality of unit areas constituting the image 3000 and including one or more pixels.

For example, each unit area constituting the plurality of unit areas may be a single pixel.

The plurality of unit areas constituting the image 3000 may include the predetermined number of single pixels. It is deemed that the shape of wrinkle such as the size, region, length, etc., of wrinkle is distributed finely, compared to the image 3000 of the entire seat. Thus, wrinkle evaluation values may be effectively derived by dividing the image 3000 into a plurality of unit areas consisting of pixels, and accordingly a wrinkle area may be determined.

In step S230, the device 1000 may determine whether a wrinkle evaluation value derived for each of the plurality of unit areas is more than a threshold value.

For example, the device 1000 may derive a wrinkle evaluation value for each of the plurality of unit areas. The wrinkle evaluation value may be used to determine whether wrinkles are present in each of the plurality of unit areas or wrinkles in which degree are determined as NG.

Specifically, the device 1000 may obtain wrinkle evaluation elements including at least one of the lightness and saturation of the plurality of unit areas, the brightness of the lighting device and the color of the seat, and determine wrinkle evaluation values based on the results of combination of the obtained wrinkle evaluation elements.

For example, the wrinkle evaluation elements may include standard wrinkle evaluation elements such as the lightness and saturation of the plurality of unit areas (image), the brightness of the lighting device and the color of the seat. The device 1000 basically detects and determines a wrinkle area based on the image 3000 of the seat, and thus the device determines wrinkles using the lightness and saturation shown in the obtained image 3000, the brightness of the lighting device and the color of the seat.

The wrinkle evaluation elements may be combined according to pre-stored wrinkle evaluation algorithm for each value of the obtained lightness and saturation, brightness of the lighting device and color of the seat, and wrinkle evaluation values may be determined based on the combination results.

In another example, in the step of determining a wrinkle evaluation value, the value may be determined differently for the seat that is made of leather or the seat that is made of fabric.

Specifically, when the seat is made of leather, a weighting may be given in order of the color of the seat, the brightness of the lighting device, the lightness and the saturation, and the device 1000 may determine a wrinkle evaluation value based on the given weighting.

When the seat is made of leather, in many cases, the color of the seat may be black, white or brown, which are definitely different. Thus, if wrinkles are detected without considering the color of the seat, the accuracy is very low. Accordingly, it would be more effective to consider the color of the seat most preferentially and detect wrinkles. Thus, the color of the seat may be given the highest weighting.

Also, leather used for the seat is manufactured undergoing processes such as surface treatment considering the convenience in many aspects for user's contact, and thus leather has a characteristic (glossy) of reflecting part of light of a lighting device, compared to fabric. Thus, the brightness of the lighting device may be given the second highest weighting in that it is possible to detect wrinkles to some degree, thanks to the characteristic of reflecting part of light of the lighting device, although the lighting device is not so bright.

Also, when the image 3000 has too low lightness, the shape of wrinkle that is shown as a shadow may not be clear because the image 3000 is dim. When the image 3000 has too high lightness, part of the wrinkle disappears because the image 3000 is bright. The lightness is given the third highest weighting in that the lightness is more important than the saturation.

Also, when the image 3000 has high or low saturation, it would be difficult to clearly identify the color of the seat or clearly detect the shape of wrinkle. However, the saturation may be given the lowest weighting in that it is less important than other elements.

In another example, when the seat is made of fabric, the light of the lighting device is scattered by the surface structure of fabric due to the characteristics of fabric, and thus fabric is very sensitive to the brightness of the lighting device. Accordingly, the brightness of the lighting device may be given the highest weighting. Further, the seat made of fabric may be manufactured in various colors. Thus, it would be more effective to determine the color of the seat and detect wrinkles. Accordingly, the color of the seat may be given the second highest weighting.

Also, when the image 3000 has too low lightness, the shape of wrinkle that is shown as a shadow may not be clear because the image 3000 is dim. When the image 3000 has too high lightness, part of the wrinkle disappears because the image 3000 is bright. The lightness may be given the third highest weighting in that the lightness is more important than the saturation.

Also, when the image 3000 has high or low saturation, it would be difficult to clearly identify the color of the seat or clearly detect the shape of wrinkle. However, the saturation may be given the lowest weighting in that it is less important than other elements.

The device 1000 may determine a wrinkle evaluation value based on a weighting given in different values and orders depending on the materials of the seat as described above. Accordingly, it is possible to effectively detect wrinkles for each seat for which wrinkles are to be detected.

According to an embodiment, the device 1000 may determine a threshold value using deep learning.

For example, the device 1000 may obtain from a memory (not shown) or server (not shown) a pre-stored learning model (e.g., Semantic Segmentation) used for deep learning for determining a wrinkle. The pre-stored learning model may include images that were labeled in advance for wrinkles of the seat under various conditions (color of seat, lightness and saturation, brightness of lighting device, material of seat, etc.).

Accordingly, the device 1000 may perform deep learning for wrinkle areas to detect a wrinkle area in the image 3000 using the obtained pre-stored learning model, and determine a threshold value for determining wrinkles for the plurality of unit areas based on the deep learning results.

According to an embodiment, when the accuracy of the results of deep learning is a predetermined value or less, the accuracy may be increased by performing re-learning using the pre-stored learning model.

In step S240, the device 1000 may determine a wrinkle area for the image 3000 based on the continuity for one or more unit areas 31000 corresponding to wrinkle evaluation values that are more than the threshold value. For example, unit areas corresponding to wrinkle evaluation values that are more than the threshold value continue, and the unit areas whose continuity is a predetermined value or more may be determined as a wrinkle area.

Figure 8:
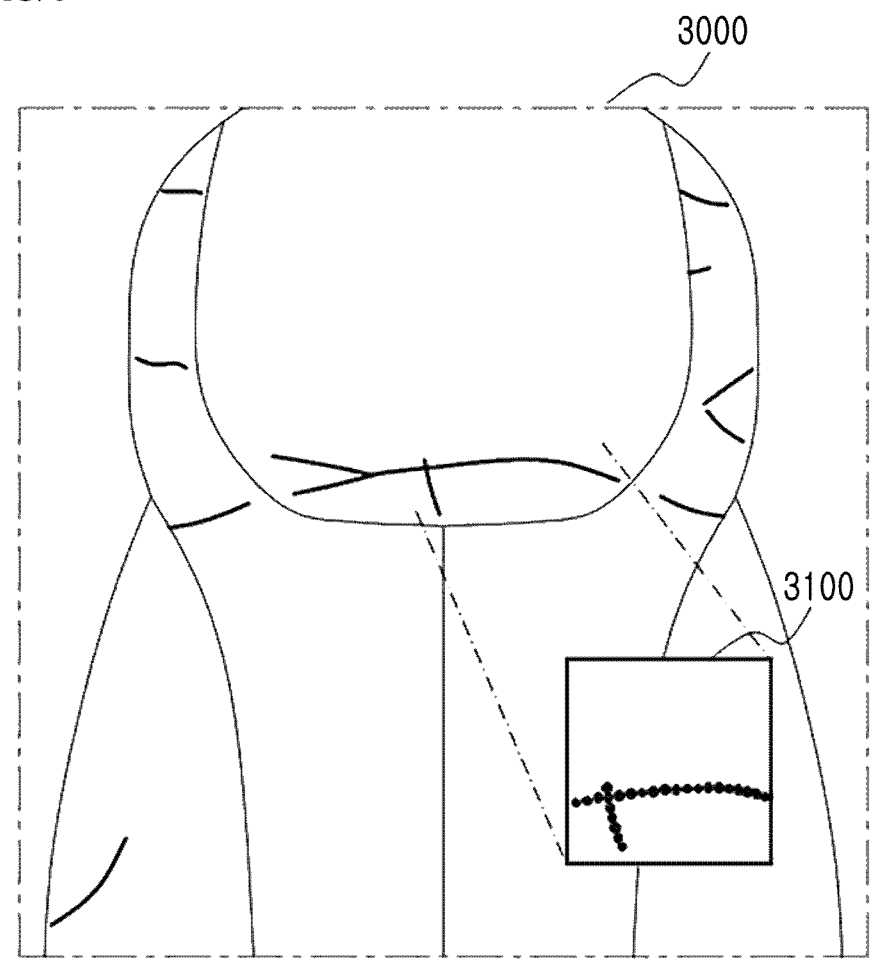
FIG. 8 is a schematic view illustrating the wrinkle area determined for the image according to an embodiment.

FIG. 8 is a schematic view illustrating the wrinkle area determined for the image 3000 according to an embodiment.

Referring to the drawing, the device 1000 may determine one or more unit areas 3100 corresponding to wrinkle evaluation values that are more than a threshold value, as shown in the drawing. Each unit area corresponds to a wrinkle evaluation value that is more than the threshold value, and thus may be an area corresponding to a wrinkle. A wrinkle area for the image 3000 may be determined based on the continuity in which these areas are distributed. Also, unit areas whose continuity is a predetermined value or less may correspond simply to a pattern, structure or damage of the seat. In this case, they may not be determined as a wrinkle area.

The device 1000 determines a wrinkle area based on the continuity for one or more unit areas 3100 having wrinkle evaluation values that are more than the threshold value, thereby more clearly distinguishing wrinkles from a pattern, structure or damaged portion of the seat, to increase the accuracy of determining the wrinkle area.

Figure 9:
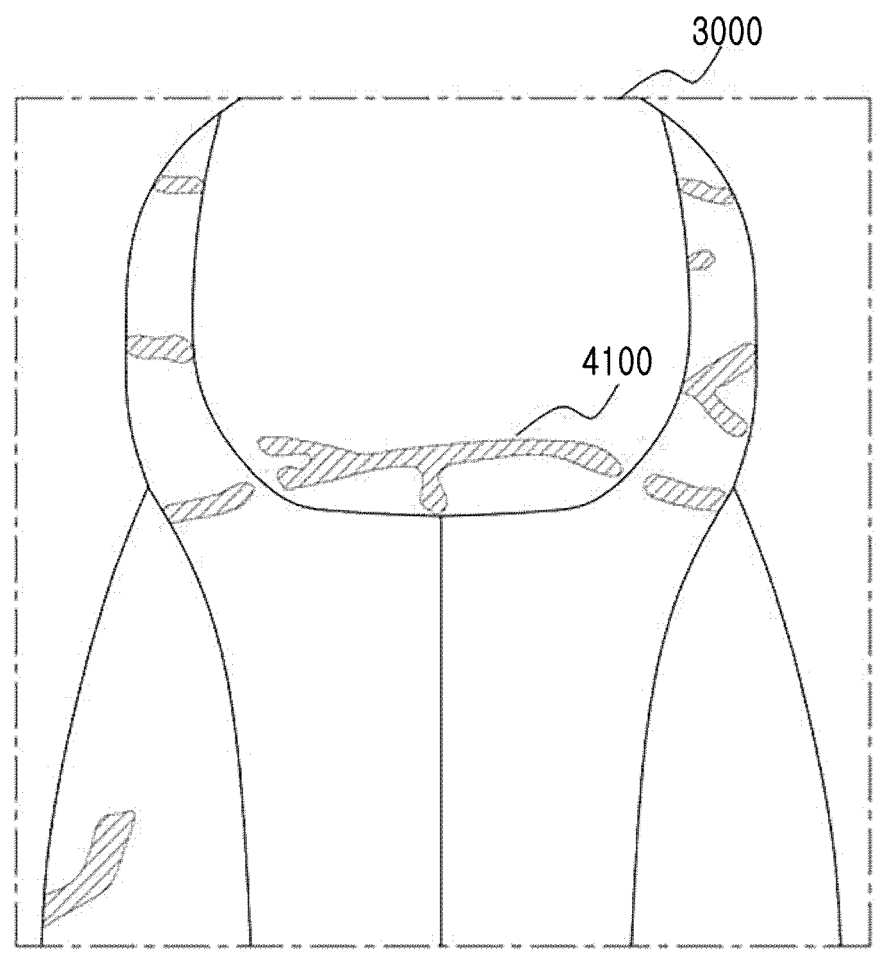
FIG. 9 is a schematic view illustrating the marking image corresponding to the wrinkle area according to an embodiment.

FIG. 9 is a schematic view illustrating the marking image 4100 corresponding to the wrinkle area according to an embodiment.

Referring to the drawing, the device 1000 may obtain a marking image 4100 corresponding to the wrinkle area. The marking image 4100 may be an image obtained to represent a wrinkle area by comprising the wrinkle area determined as in the description with reference to step S240 and FIG. 8 and the range of the predetermined values for the wrinkle area.

Figure 10:
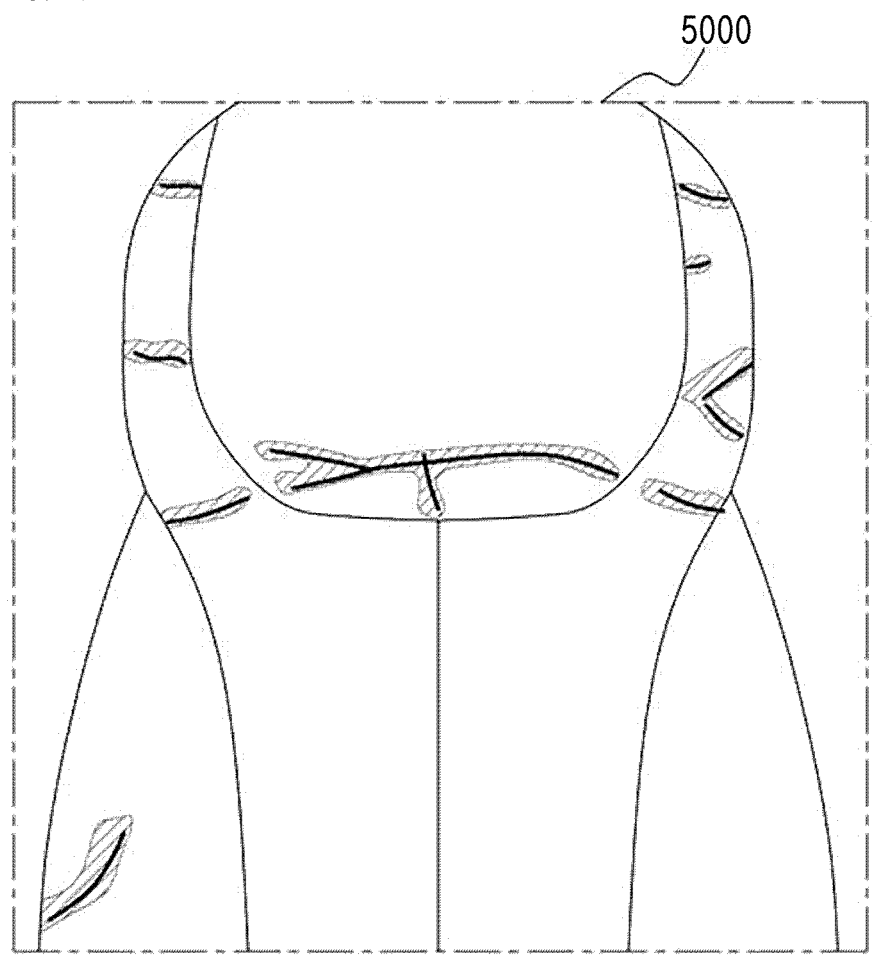
FIG. 10 is a schematic view illustrating the result image according to an embodiment.

FIG. 10 is a schematic view illustrating the result image 5000 according to an embodiment.

Referring to the drawing, in the step of determining the wrinkle area, the device 1000 may obtain the coordinates of a wrinkle area for the image 3000 and display the wrinkle area on the image 3000 according to the obtained coordinates. Also, the device 1000 may match the marking image 4100 corresponding to the wrinkle area with the image 3000 on which the wrinkle area is displayed to obtain the result image 5000 in which the wrinkle area and the marking image 4100 overlap with each other.

As such, a user may more easily see the results of determination of a wrinkle area with the naked eyes by receiving the result image 5000 in which the image 3000 on which the wrinkle area is displayed and the marking image 4100 are matched with each other.

Figure 11:
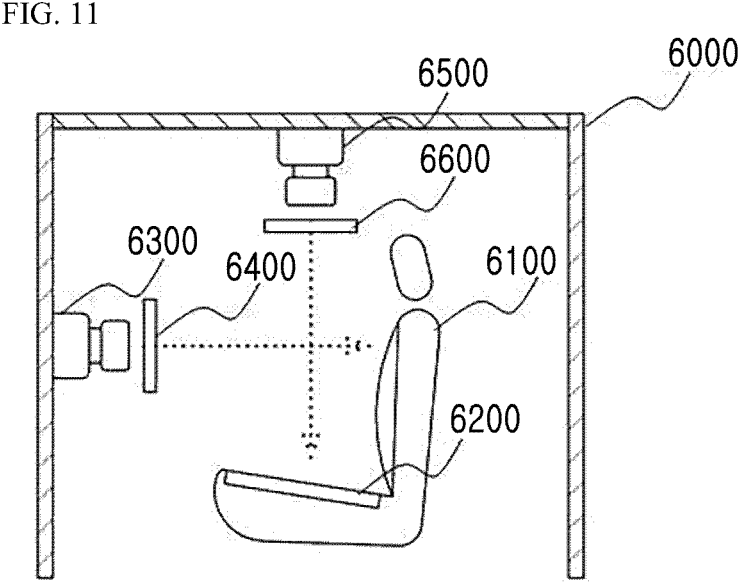
FIG. 11 is a schematic view illustrating the structure type according to an embodiment.

FIG. 11 is a schematic view illustrating the structure type 6000 according to an embodiment.

Referring to the drawing, the device 1000 may be provided as the structure type 6000 to obtain an image 3000 for the seat using one or more cameras 1100 and lighting devices.

For example, the device 1000 may comprise a first test camera 6300 oriented toward a back seat 6100 and a second test camera 6500 oriented toward a cushion seat 6200. Also, the device 1000 of the structure type 6000 may further comprise a first lighting device 6400 oriented toward the back seat 6100 and a second lighting device 6600 oriented toward the cushion seat 6200, which operate along with the camera 1100 to obtain the image 3000. The device 1000 may obtain the overall and detailed images of the back seat 6100 and the overall and detailed images of the cushion seat 6200 by operation of each camera 1100 and lighting device.

The device 1000 provided as the structure type 6000 may solve the problem that when the camera 1100 and lighting device are oriented in the same direction, a wrinkle area is not clearly shown due to light radiated directly on the seat. Further, when the camera 1100 and lighting device are configured to be oriented in different directions as above, light of the lighting device is radiated in parallel with the subject seat for image taking, and thus a wrinkle area with curves is shaded by the radiated light, which makes the wrinkle area clearer.

The device 1000 according to an embodiment may determine a wrinkle level of the wrinkle area to represent wrinkle severity over the wrinkle area.

Specifically, different wrinkle levels may be determined depending on the materials of seat.

For example, when the seat is made of leather, a weighting may be given in order of wrinkle width, wrinkle depth, wrinkle length and wrinkle number, and a wrinkle level may be determined based on the given weighting.

When the seat is made of leather, in general, wrinkles formed on the seat are broad, and it is deemed that the wrinkles are formed over a large area as the wrinkles have a broad width. Thus, the highest weighting may be given to wrinkle width. Further, the second highest weighting may be given to wrinkle depth in that the wrinkles need to be removed more quickly when the wrinkles are formed deeply due to the characteristics of leather.

Also, it is deemed that the longer wrinkles, the more severe wrinkles. However, the long wrinkle may be removed relatively easily compared to the wide wrinkle and deep wrinkle, and thus is less important. Thus, the third highest weighting may be given to wrinkle length. Further, it is deemed that the more wrinkles, the more severe wrinkles. However, relatively less wrinkles are formed due to the characteristics of leather, and wrinkle number is less important than wrinkle width, wrinkle depth and wrinkle length. Thus, the fourth highest weighting may be given to wrinkle number.

When the seat is made of fabric, the seat is easily crumpled with a relatively small force due to the characteristics of fabric, and more wrinkles are formed compared to the seat made of leather. Thus, the highest weighting may be given to wrinkle number. Further, long wrinkles are relatively frequently formed compared to the seat made of leather. Thus, the second highest weighting may be given to wrinkle length.

Also, fabric is easily expanded, whereas easily crumpled, and has greater resilience than leather, which causes relatively less deep wrinkles. Thus, the third highest weighting may be given to wrinkle depth. For the foregoing reasons, narrow wrinkles are formed, and wrinkle width is less important because wrinkles generally formed have a narrow width. Thus, the fourth highest weighting may be given to wrinkle width.

The device 1000 may determine a wrinkle level for a wrinkle area based on the weightings given differently depending on the materials of the seat as any one of first level for severe wrinkle, second level for moderate wrinkle and third level for mild level, and provide the notice asking to check whether a problem occurs during a process of manufacturing the seat based on the determined wrinkle level.

As such, it is possible to support to quickly confirm whether a problem occurs during a manufacturing process by determining a level of the wrinkle area based on the fact that the formed wrinkles have different characteristics depending on the materials of the seat, and providing the notice according to the wrinkle level.

Meanwhile, the device 100, 1000 according to an embodiment as described above may comprise one or more processors 120, 1200 and/or one or more memories. Also, FIG. 1 and FIG. 6 show only essential components for describing the device 100, 1000 according to an embodiment for the sake of convenience in description, but conventional components for constituting a device of the invention such as a display (not shown) may be systematically combined to perform the operations described in FIG. 1 to FIG. 11.

Also, the memory may include volatile and/or nonvolatile memories. One or more memories may store commands for the one or more processors 120, 1200 to execute computation, when executed by the one or more processors 120, 1200. In the present disclosure, programs or commands may include, as software stored in the memories, operating systems that manage a server's resources, applications and/or middleware that provides various functions to applications such that the applications can use the device's resources.

One or more processors 120, 1200 may drive software (e.g., programs, commands) to control at least one component of a device connected to the processor 120, 1200. Also, the processor 120, 1200 may perform various operations such as computing, processing, data generating and processing, etc., in connection with the present disclosure. Also, the processor 120, 1200 may load data, etc., from a memory or store the same in a memory.

According to an embodiment, at least one component of the device 100, 1000 may be omitted or other components may be added. Also, additionally or alternatively, some components are integrally implemented or implemented as a single individual or a plurality of individuals.

The method described in connection with the embodiments of the present invention or the steps of algorithm may be implemented as hardware directly, a software module executed by hardware, or a combination thereof. The software module may be a random access memory (RAM), a read only memory (ROM), an erasable programmable ROM (EPROM), a flash memory, a hard disk, a removable disk, a CD-ROM, or any form of computer readable recording medium well known in the art.

The foregoing description of embodiments of the present invention with reference to the drawings is intended for illustration, and those skilled in the art can understand that the present invention can be implemented in other specific forms without changing the technical spirit or essential features of the present invention. Therefore, it should be construed that the embodiments described above are exemplary in all respects and not restrictive.

What is claimed is:

1. A method for determining a wrinkle area for a seat by a device, the method comprising:
    obtaining a first image of the whole of a back seat;
    obtaining a second image of the whole of a cushion seat;
    obtaining deep learning information used for analyzing the images of the back seat and cushion seat;
    determining a problem area from the first image and second image using the deep learning information;
    obtaining a detailed image of the problem area; and
    determining a wrinkle area using the detailed image,
    wherein the deep learning information is obtained based on image analysis results on a test back seat and a test cushion seat which form a test seat, and
    wherein the obtaining deep learning information comprises:
    obtaining an image of the test back seat from a first test camera oriented toward the test back seat while a second lighting device oriented toward the test cushion seat operates;
    obtaining an image of the test cushion seat from a second test camera oriented toward the test cushion seat while a first lighting device oriented toward the test back seat operates; and
    obtaining the deep learning information using the image of the test back seat and the image of the test cushion seat,
    wherein the device comprises one or more cameras.

2. The method of claim 1, wherein the determining a problem area comprises:
    determining a plurality of areas by dividing each of the first image and second image according to a predetermined way; and
    determining one or more areas among the plurality of areas as the problem area using the deep learning information,
    wherein the detailed image is obtained while a camera oriented toward the back seat or cushion seat moves along a path of traveling the plurality of areas.

3. The method of claim 1, wherein the obtaining a detailed image comprises:
    determining a moving speed of a camera according to the location of the camera based on pre-analysis results on the problem area; and
    obtaining the detailed image from the camera moving at the moving speed.

4. The method of claim 1, further comprising:
    determining a type of wrinkle of the wrinkle area based on wrinkle size and wrinkle depth corresponding to the wrinkle area;
    determining an ironing way including ironing number and ironing time corresponding to the type of wrinkle; and
    ironing the wrinkle area according to the ironing way.

5. A device for determining a wrinkle area for a seat, the device comprising:
    one or more cameras for obtaining a first image of the whole of a back seat and a second image of the whole of a cushion seat; and
    a processor for obtaining deep learning information used for analyzing the images of the back seat and cushion seat, and determining a problem area from the first image and second image using the deep learning information,
    wherein the one or more cameras obtain a detailed image of the problem area, and the processor determines a wrinkle area using the detailed image,
    wherein the deep learning information is obtained based on image analysis results on a test back seat and a test cushion seat which form a test seat, and
    wherein the obtaining deep learning information comprises:
    obtaining an image of the test back seat from a first test camera oriented toward the test back seat while a second lighting device oriented toward the test cushion seat operates;
    obtaining an image of the test cushion seat from a second test camera oriented toward the test cushion seat while a first lighting device oriented toward the test back seat operates; and
    obtaining the deep learning information using the image of the test back seat and the image of the test cushion seat.

6. A method for determining a wrinkle area for a seat by a device, the method comprising:
    obtaining an image of the seat;
    determining a plurality of unit areas constituting the image and including one or more pixels;
    determining whether a wrinkle evaluation value derived for each of the plurality of unit areas is more than a threshold value; and determining a wrinkle area for the image based on the continuity of one or more unit areas corresponding to the wrinkle evaluation values that are more than the threshold value, obtaining wrinkle evaluation elements including at least one of the lightness and saturation of the plurality of unit areas, brightness of a lighting device, and color of the seat; and determining the wrinkle evaluation value based on the results of combination of the obtained wrinkle evaluation elements, wherein the threshold value is determined from deep learning, and the determining the threshold value comprises:

performing the deep learning on the wrinkle area using a pre-stored learning model; and determining the threshold value for determining a wrinkle for the plurality of unit areas based on the results of the deep learning, and further comprises:

performing re-learning when the accuracy of the results of the deep learning is a predetermined value or less, wherein the device comprises one or more cameras.

7. The method of claim 6, wherein each unit area constituting the plurality of unit areas is a single pixel.

8. The method of claim 6, further comprising:
displaying the wrinkle area on the image;
obtaining a marking image corresponding to the wrinkle area; and
matching the marking image with the image to obtain a result image.

9. The method of claim 6, wherein the determining a wrinkle evaluation value comprises:
when the seat is made of leather, giving a weighting in order of the color of the seat, the brightness of the lighting device, the lightness and the saturation;
when the seat is made of fabric, giving a weighting in order of the brightness of the lighting device, the color of the seat, the lightness and the saturation; and
determining the wrinkle evaluation value based on the weighting.

10. A device for determining a wrinkle area for a seat, the device comprising:
one or more cameras for obtaining an image of the seat; and
a processor for determining a plurality of unit areas constituting the image and including one or more pixels, determining whether a wrinkle evaluation value derived for each of the plurality of unit areas is more than a threshold value, and determining a wrinkle area for the image based on the continuity of one or more unit areas corresponding to the wrinkle evaluation values that are more than the threshold value, obtaining wrinkle evaluation elements including at least one of the lightness and saturation of the plurality of unit areas, brightness of a lighting device, and color of the seat; and determining the wrinkle evaluation value based on the results of combination of the obtained wrinkle evaluation elements, wherein the threshold value is determined from deep learning, and the determining the threshold value comprises:

performing the deep learning on the wrinkle area using a pre-stored learning model; and determining the threshold value for determining a wrinkle for the plurality of unit areas based on the results of the deep learning, and further comprises:

performing re-learning when the accuracy of the results of the deep learning is a predetermined value or less.

* * * * *